Sept. 28, 1971    TERUMOTO YAMAGUCHI    3,608,350
APPARATUS AND METHOD FOR PRODUCING BLANKS FOR COMMUTATORS
FOR MINIATURE ELECTRIC DEVICES Filed March 4, 1969            5 Sheets-Sheet 1

INVENTOR
TERUMOTO YAMAGUCHI
BY
Linton and Linton
ATTORNEYS

INVENTOR
TERUMOTO YAMAGUCHI
BY
ATTORNEYS

United States Patent Office 3,608,350
Patented Sept. 28, 1971

3,608,350
APPARATUS AND METHOD FOR PRODUCING BLANKS FOR COMMUTATORS FOR MINIATURE ELECTRIC DEVICES
Terumoto Yamaguchi, 10f 55 Ikeura, Ikeura-cho, Ango-shi, Aichi-ken, Japan
Continuation-in-part of application Ser. No. 575,778, Aug. 29, 1966. This application Mar. 4, 1969, Ser. No. 804,104
Int. Cl. H01r 43/02
U.S. Cl. 72—358                          3 Claims

ABSTRACT OF THE DISCLOSURE

The present method and apparatus is for producing commutator blanks for miniature electric devices wherein a tube blank made of materials having good electrical conductivity is fed into a die having a number of grooves corresponding to the number of bridge pieces of the commutator and pressed by means of a punch provided with a number of teeth similar to that of the commutator bars or segments whose adjoining bars or segments are connected together by bridge pieces.

---

Figure 1A:
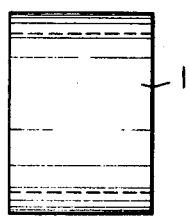

The present invention relates to a method and apparatus for producing commutators for miniature electric machines such as dynamos, starters and the like for use in automobiles.

The present application is a continuation-in-part of my co-pending application, Ser. No. 575,778, filed Aug. 29, 1966, now abandoned.

BACKGROUND OF THE INVENTION

In accordance with a typical conventional method of the prior art a strip blank for a commutator is gradually fed longitudinally into a press for successive pressing; adjacent commutator bars or segments are connected with one another by bridge pieces protruding toward the backface direction and provided with hook-like lugs on the inner side thereof, whereby the bars or segments are formed into a ring, subsequently a fluid insulating compound adapted to be hardened is injected in the ring; and after the insulating compound has hardened, the periphery is machined to remove the aforementioned bridge pieces to divide the commutator bars or segments into the respective pieces.

The above-mentioned method, however, has such a disadvantage that the number of press cycles must be carried out in proportion to the number of the commutator bars or segments to be produced; accordingly, it takes a long time before all the bars or segments for one commutator are formed, and additionally, since they are protruding outward, the bridge pieces are subject to tensile stress during press operation and likely to be broken. Further disadvantages are that since the commutator bars or segments are pressed one by one so that the uniform width of each bar or segment cannot be obtained due to feeding speed variation of the strip blank, etc. and that when the strip material connecting each of the bars or segments is formed into a ring shape, it tends to become an oval so that the machining tolerance around the outer periphery thereof must be provided rather larger.

Such aforementioned problems and disadvantages involved in the prior art can be overcome by the present invention, which provides a method for producing commutators for miniature electric machines wherein a tube blank is fed into a die having a number of grooves corresponding to the number of bridge pieces, and pressed by means of extrusion, cold forming, or ironing, or drawing by a punch provided with the same number of teeth with that of the commutator bars or segments so as to form the commutator bars or segments whose adjacent commutator bars or segments are connected with one another by bridge pieces. Thus, the bridge pieces can be formed hard enough not to be broken, the uniform width of each bar or segment can be obtained and further, the machining time and tolerance can be reduced.

DESCRIPTION OF THE INVENTION

The present invention provides a method for producing commutators for miniature electric machines wherein in order to eliminate the problems and disadvantages involved in the prior art, a tube blank is fed into a die having a number of grooves corresponding to the number of bridge pieces, and pressed by means of extrusion by a punch provided with the same number of teeth with that of the commutator bars or segments so as to form the commutator bars or segments whose adjacent commutator bars or segments are connected with one another by bridge pieces, whereby the working time can be reduced, the bridge pieces can be formed hard enough not to be broken, further, the width of each of the commutator bars or segments can be made uniform, and the machining tolerance of the outer periphery can be reduced.

Figure 1B:
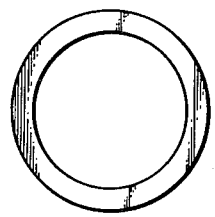
Figure 2A:
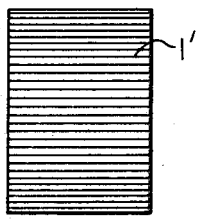
Figure 2B:
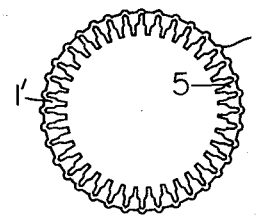
Figure 3:
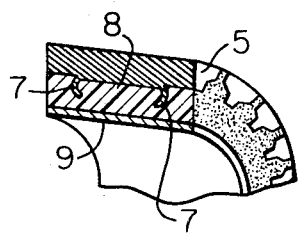
Figure 5:
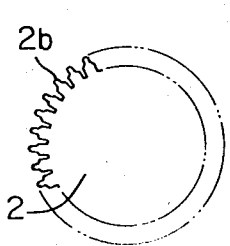
Figure 6:
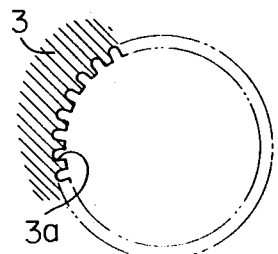
Figure 7:
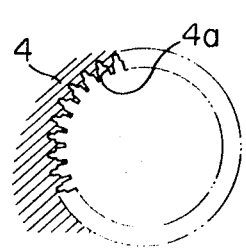
Figure 4:
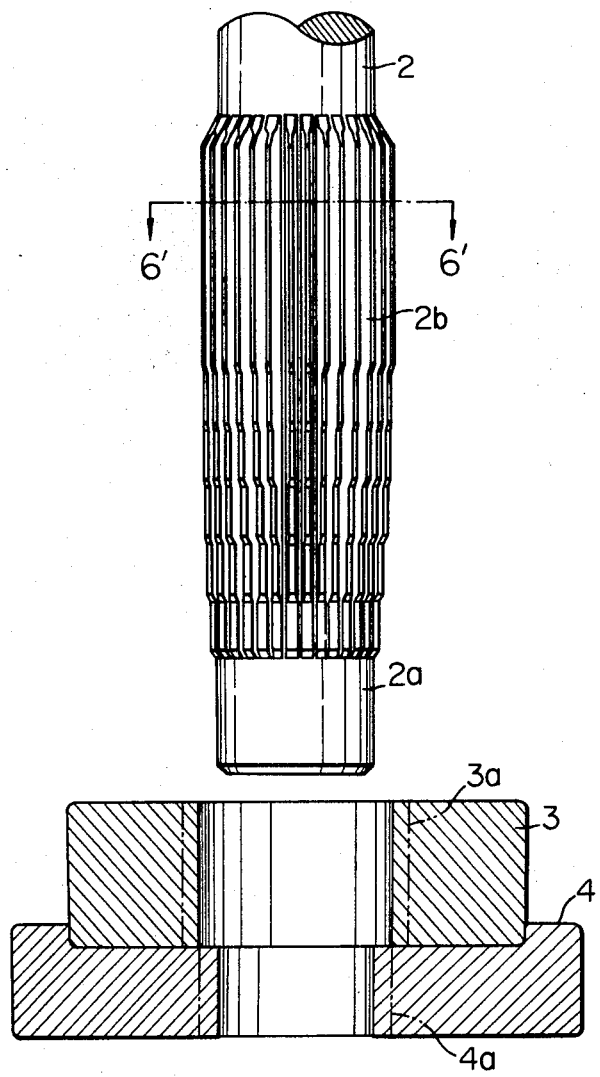
Figure 4:
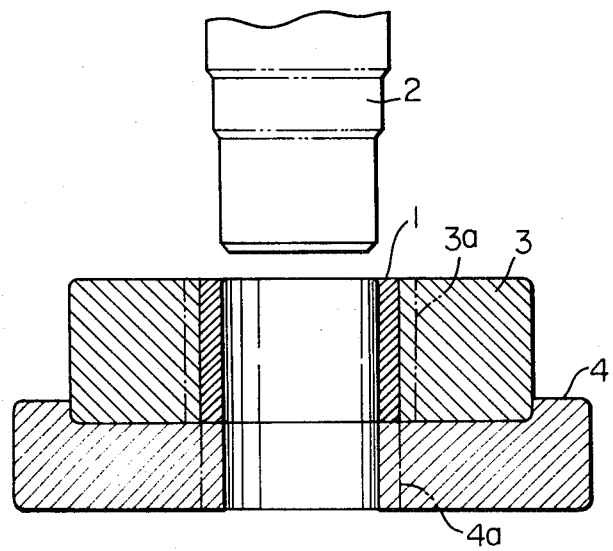
Figure 4:
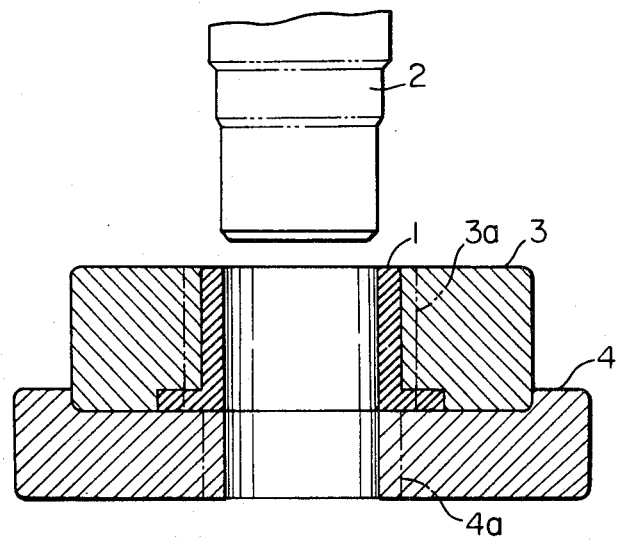
Figure 6:
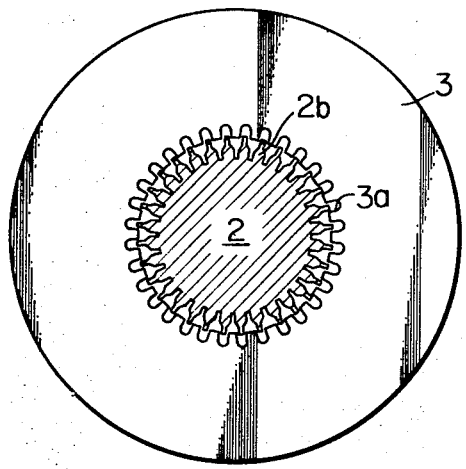
Figure 6:
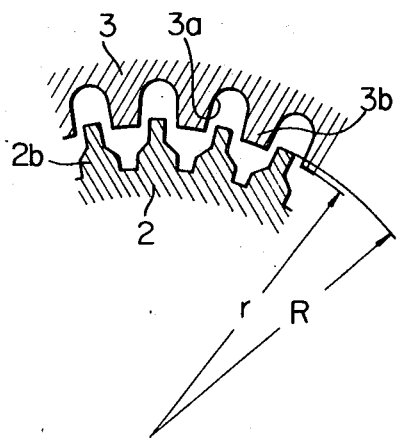
Figure 7:
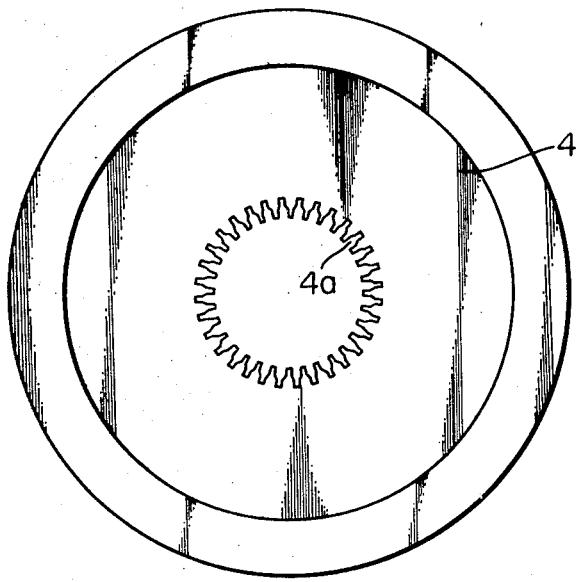
Figure 8:
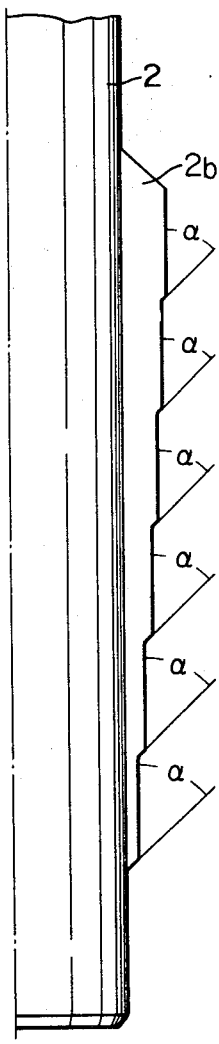

All of the foregoing and still further objects and advantages of this invention will become apparent from the specification described hereinbelow with reference to the accompanying drawings, wherein:

FIG. 1(a) is a side elevation of an example of a tube blank for use with the present invention, FIG. 1(b) is a top view of said tube blank, FIG. 2(a) is a side elevation of said tube blank after being finished by extrusion, FIG. 2(b) is a top view of said finished tube blank, FIG. 3 is a perspective view, partly broken away, of a part of the finished commutator, FIG. 4 is a side view, partly in section, of the present extruding apparatus, FIG. 4' is a view similar to FIG. 4 of the lower part of the extruding apparatus with a plain tubular blank set therein, FIG. 4" is a view similar to FIG. 4', but with a tubular blank having a flange set in said extruding apparatus, FIG. 5 is a transverse cross-sectional view of the teeth of a punch used in the present apparatus, FIG. 6 is a transverse cross-sectional view of a die used in the present apparatus, FIG. 6' is a transverse cross-sectional view of a punch and die cut across line 6'—6' of FIG. 4, FIG. 6" is an enlarged view of FIG. 6' showing the relation between punch teeth and grooves of the die, FIG. 7 is a transverse cross-sectional view of a die holder of the present apparatus, FIG. 7' is an elevational view of the die holder of FIG. 7, and FIG. 8 is an enlarged partial side view of the punch showing that the differences of the radii of the steps of the teeth becomes proportionally greater as they proceed to the tip end of the punch.

Referring now more particularly to the drawings and especially FIGS. 1 and 4, the punch 2 is provided at its tip end with a guide 2a having an outside diameter corresponding to the inside diameter of the tube blank 1 which is of an electrical conductive material, such as copper. Around the circumference of the upper portion of the punch there are provided the same number of teeth 2b as shown in FIG. 5 as that of the commutator bars or segments. Said teeth 2b are stepped inwardly as shown in FIGS. 4 and 8, towards the guide 2a and the differences of the radii, as shown in FIG. 8, becomes smaller as the interval from guide 2a increases and the depth of the grooves between the teeth increases as the distance from guide 2a increases. It is necessary to select the number of the steps or shoulders depending upon the variation in the product. It is preferred to incline the face of the shoulder a an angle to the axis of the punch 2, the angle being from 30° to 60°, as shown in FIG. 8. The die 3 will be apt to be broken because of an excessive radial force and the load required for the operation will be increased if the angle is less than 30°. The tubular blank 1 will be excessively shaved and the punch 2 becomes damaged in early operating period, if the angle is more than 60°. Such a punch 2 makes it possible to produce commutator blanks with less stress as the stress on the teeth 2a is divided between each step and the stress concentration in operation is lighter. Also, the blanks can be made with uniformity and precision as well as making it possible to produce bridge pieces thinner and the width and depth of the grooves between each of the commutator bars or segments can be made narrower and deeper than by convention methods.

The cylindrical die 3 has the same number of grooves 3a adapted to form bridge pieces as that of the bridge pieces to be provided around the tube as shown in FIG. 6. It should be noted that the distance from the center to the top of the punch teeth 2b, that is, the outer radius of the punch 2, R is a little larger than the distance from the center to the die teeth 3b between the grooves 3a of the die 3, that is, the inner radius of the die 3r. The die holder 4 is provided with the tooth-shaped grooves 4a as illustrated in FIG. 7, the same in number as said teeth 2b, said grooves being designed as to suitably fit with the teeth 2b of the punch 2. The extruding machine consists of the punch 2, the die 3 and the die holder 4. In principle, the root diameter of the teeth 2b of the punch 2 is slightly smaller than the inside diameter of the tube blank and the outside diameter of the teeth is appreciably larger than that of the finished commutator. However, it is permitted, if necessary, to make the diameters equal or slightly smaller.

The method of producing the commutator blanks by using the machine with the above-mentioned arrangement will be described hereinafter. First, the tube blank 1 is fed in the die 3 mounted on the extruding machine, and pressed from above into the desired form by the punch 2; thus, the ring-shaped extruded article 1' wherein the adjacent commutator bars or segments 5 being connected with one another by means of the bridge pieces 6 protruding outward as shown in FIG. 2(b) may be obtained. Then, hook-like lugs 7 are provided on the inner side of each commutator bar or segment of the extruded article 1' by any suitable well known process and subsequently, the fluid insulating compound of hardenability 8 is injected and the shaft fixing tube 9 is inserted, and after the setting of the insulating compound, the outer periphery is machined to remove the bridge pieces 6 to separate the commutator bars or segments 5 into each piece, obtaining a finished commutator as shown in FIG. 3.

It is sometimes desirable to produce commutators having a flange and as shown in FIG. 4" a commutator having a flange can also be made by the present method and apparatus.

The present apparatus can produce commutator blanks from the tube blank 1 which is the same size as the finished commutator and thus, makes it possible to produce commutator blanks in a single process witth more precision and simplicity than with previously known apparatus. Because of the extrusion process, the direction of the fiber flow of the segments is parallel to the axis of the commutator, and the hook-like lugs are made parallel to the direction making the lugs stronger.

I claim:

1. A method of manufacturing a commutator consisting in placing a cylindrical copper blank having the same length with the commutator to be manufactured in a die having grooves having the same intervals one after the other and the same depth with bridging members to be formed on the outer periphery of said blank, forcing a punch through said blank, said punch having teeth having the same intervals one after the other, said die being set on a die holder having a hole having a minimum diameter equal to the inner diameter of said blank and grooves through which said teeth are passable in order to prevent the blank from axial elongation, whereby grooves are formed on the inner periphery of said blank and bridging members which are to be removed afterwards are formed on the outer periphery thereof, fixing the thus formed blank to a shaft fixing pipe by a thermo-setting liquid insulating compound, and machining the outer periphery of the formed blank.

2. An apparatus for producing a commutator blank having a plurality of segments connected to bridging portions from a tubular blank of electrical conducting material comprising a die having a bore with a plurality of grooves therein corresponding to said commutator bridging portions and capable of receiving said tubular blank therein, punch having a plurality of longitudinal stepped teeth corresponding to the commutator segments with said teeth slanting inwardly towards one end of said punch whereby said punch can press said tubular blank in said die to provide the commutator blank, a die holder having a hole whose minimum diameter equals the inner diameter of said blank and grooves through which said teeth are passable.

3. An apparatus as claimed in claim 2, wherein said punch teeth steps having smaller differences in their radii as the interval between said steps increases from the tip of the punch, said punch has grooves between said teeth whose depth increases as the distance of said grooves from said punch tip increases and said punch steps have the axial distance between adjoining steps becoming longer from the head to the tail of said punch and that the cross-sectional contour of the outer end of each of said teeth is a rounded inverted V.

References Cited

UNITED STATES PATENTS

| 1,633,922 | 6/1927 | Carter | 29—597 |
| 2,688,793 | 9/1954 | Carlson | 29—597 |
| 3,407,491 | 10/1968 | Clevenger et al. | 29—597 |

FOREIGN PATENTS

| 359,200 | 2/1962 | Switzerland | 29—597 |

LOWELL A. LARSON, Primary Examiner

U.S. Cl. X.R.

29—597; 72—370